United States Patent
Tamura

(10) Patent No.: US 9,594,455 B2
(45) Date of Patent: Mar. 14, 2017

(54) PROJECTOR AND CONTROL METHOD

(71) Applicant: Seiko Epson Corporation, Tokyo (JP)

(72) Inventor: Akihiko Tamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 17 days.

(21) Appl. No.: 14/252,379

(22) Filed: Apr. 14, 2014

(65) Prior Publication Data
US 2014/0306939 A1    Oct. 16, 2014

(30) Foreign Application Priority Data
Apr. 16, 2013  (JP) ................ 2013-085523

(51) Int. Cl.
G06F 3/041 (2006.01)
G06F 3/042 (2006.01)

(52) U.S. Cl.
CPC .......... G06F 3/0418 (2013.01); G06F 3/0425 (2013.01)

(58) Field of Classification Search
None
See application file for complete search history.

(56) References Cited

U.S. PATENT DOCUMENTS

| | | | | |
|---|---|---|---|---|
| H001840 H | * | 2/2000 | Carew | E02F 9/26 702/85 |
| 6,709,116 B1 | * | 3/2004 | Raskar | G01B 11/25 348/E5.137 |
| 2004/0150835 A1 | * | 8/2004 | Frick | H04N 9/3182 356/601 |
| 2004/0155965 A1 | * | 8/2004 | Jaynes et al. | 348/189 |
| 2006/0007177 A1 | * | 1/2006 | McLintock | 345/173 |
| 2010/0315602 A1 | * | 12/2010 | Takahashi | H04N 9/3185 353/70 |
| 2011/0193978 A1 | * | 8/2011 | Wu et al. | 348/208.6 |
| 2011/0292218 A1 | * | 12/2011 | Ichieda | 348/177 |
| 2012/0026088 A1 | * | 2/2012 | Goran | 345/158 |
| 2012/0223972 A1 | * | 9/2012 | Hsu | 345/659 |
| 2013/0069870 A1 | | 3/2013 | Ichieda | |
| 2015/0029098 A1 | | 1/2015 | Ichieda | |

FOREIGN PATENT DOCUMENTS

| | | |
|---|---|---|
| JP | 04-344515 A | 12/1992 |
| JP | 2007-019776 A | 1/2007 |
| JP | 2008-033762 A | 2/2008 |
| JP | 2012-173447 A | 9/2012 |
| JP | 2013-064917 A | 4/2013 |

* cited by examiner

*Primary Examiner* — Alexander Eisen
*Assistant Examiner* — Kebede Teshome
(74) *Attorney, Agent, or Firm* — ALG Intellectual Property, LLC

(57) ABSTRACT

A projector includes a projection section adapted to project a projection image on a projection surface, an imaging section adapted to generate a shot image obtained by shooting a range including the projection image projected by the projection section, a detection section adapted to detect a motion of the projector, and an execution section adapted to execute a predetermined process with respect to a calibration for making a correspondence between a coordinate system of the projection image and a coordinate system of the shot image in a case in which the detection section detects the motion of the projector.

7 Claims, 10 Drawing Sheets

PROJECTOR AND CONTROL METHOD

The entire disclosure of Japanese Patent Application No. 2013-085523, filed Apr. 16, 2013 is expressly incorporated by reference herein.

BACKGROUND

1. Technical Field

The present invention relates to a projector and a control method.

2. Related Art

There has been known an interactive system provided with a projector for projecting an image on a projection surface, and a light emitting pen operated by the user on the image projected (see, e.g., JP-A-2012-173447). The light emitting pen emits an infrared ray from the pen tip, and the projector shoots the infrared ray from the light emitting pen with an imaging section to recognize the position of the light emitting pen. In such an interactive system as described above, in order to correctly recognize the position of the light emitting pen, it is necessary to perform in advance a calibration for making a correspondence between positions on the image to be projected (the projection image) and positions on the image shot (the shot image).

However, in some cases, the positional relationship between the projector and the projection surface varies (e.g., the projector is moved due to some cause) after the calibration has been performed. In this case, since the correspondence relationship between the positions on the projection image and the positions on the shot image is changed, there is a problem that it becomes unachievable to correctly recognize the position of the light emitting pen. As described above, there is a problem that the convenience of the user is insufficient in the interactive system.

SUMMARY

An advantage of some aspects of the invention is to provide a projector and a control method each capable of enhancing the convenience of the user in an interactive system.

(1) An aspect of the invention is directed to a projector including a projection section adapted to project a projection image on a projection surface, an imaging section adapted to generate a shot image obtained by shooting a range including the projection image projected by the projection section, a detection section adapted to detect a motion of the projector, and an execution section adapted to execute a predetermined process with respect to a calibration for making a correspondence between a coordinate system of the projection image and a coordinate system of the shot image in a case in which the detection section detects the motion of the projector.

According to this configuration, the projector can detect the motion of the device itself, and can perform the predetermined process regarding the calibration in the case of detecting the motion of the device itself. Therefore, the convenience of the user can be enhanced in the interactive system.

(2) Another aspect of the invention is directed to the projector described above, wherein the process executed by the execution section is a process for prompting execution of the calibration.

According to this configuration, the projector can detect the motion of the device itself, and can prompt the user for the execution of the calibration based on the detection result.

(3) Still another aspect of the invention is directed to the projector described above, wherein the process executed by the execution section is a process of executing the calibration.

According to this configuration, the projector can detect the motion of the device itself, and can automatically execute the calibration based on the detection result.

(4) Yet another aspect of the invention is directed to the projector described above, wherein the detection section detects the motion of the projector based on the shot image shot by the imaging section.

According to this configuration, the projector can detect the motion of the device itself based on the shot image, and can perform the predetermined process regarding the calibration in the case of detecting the motion of the device itself. Therefore, the convenience of the user can be enhanced in the interactive system.

(5) Still yet another aspect of the invention is directed to the projector described above, wherein the detection section detects the motion of the projector based on a change in image between a reference image shot by the imaging section in advance, and the shot image shot by the imaging section after shooting the reference image.

According to this configuration, the motion of the device itself can be detected in accordance with the change in image between the reference image shot in advance and the shot image thus taken.

(6) Further another aspect of the invention is directed to the projector described above, wherein the detection section detects the motion of the projector based on a change in image between the reference image and a plurality of shot images shot by the imaging section after shooting the reference image.

According to this configuration, it is possible for the projector to detect the motion of the device itself based on the change in image between the reference image and the plurality of shot images.

(7) Still further another aspect of the invention is directed to the projector described above, wherein the detection section calculates a sum of absolute differences from the reference image for each of the shot images, compares at least one of an average and a variance of the sums of absolute differences calculated with a predetermined threshold value, and detects the motion of the projector based on the comparison result.

According to this configuration, it is possible for the projector to detect the motion of the device itself by calculating the sums of absolute differences between the plurality of shot images and the reference image. Therefore, it is possible to inhibit the change caused in the case in which, for example, a person is temporarily reflected in some shot image from being detected as the motion of the projector, and thus, the detection accuracy of the motion of the projector can be improved. Further, the projector can make the motion detection process of the projector easier by comparing either one of the average and the variance of the sums of differences between the reference image and the plurality of shot images with a threshold value to thereby detect the motion of the projector.

(8) Yet further another aspect of the invention is directed to a control method including projecting, by a projector, a projection image on a projection surface, generating, by the projector, a shot image obtained by shooting a range including the projection image projected in the projecting, detecting, by the projector, a motion of the projector, and executing, by the projector, a predetermined process with respect to a calibration for making a correspondence between a coordinate system of the projection image and a coordinate system of the shot image in a case in which the motion of the projector is detected in the detecting.

According to this configuration, it is possible for the control method to control the projector so as to be able to detect the motion of the device itself, and perform the predetermined process regarding the calibration in the case of detecting the motion of the device itself. Therefore, the convenience of the user can be enhanced in the interactive system.

According to the aspects of the invention, the convenience of the user can be enhanced in the interactive system.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Embodiment

Hereinafter, an embodiment of the invention will be explained in detail with reference to the accompanying drawings.

Figure 1:
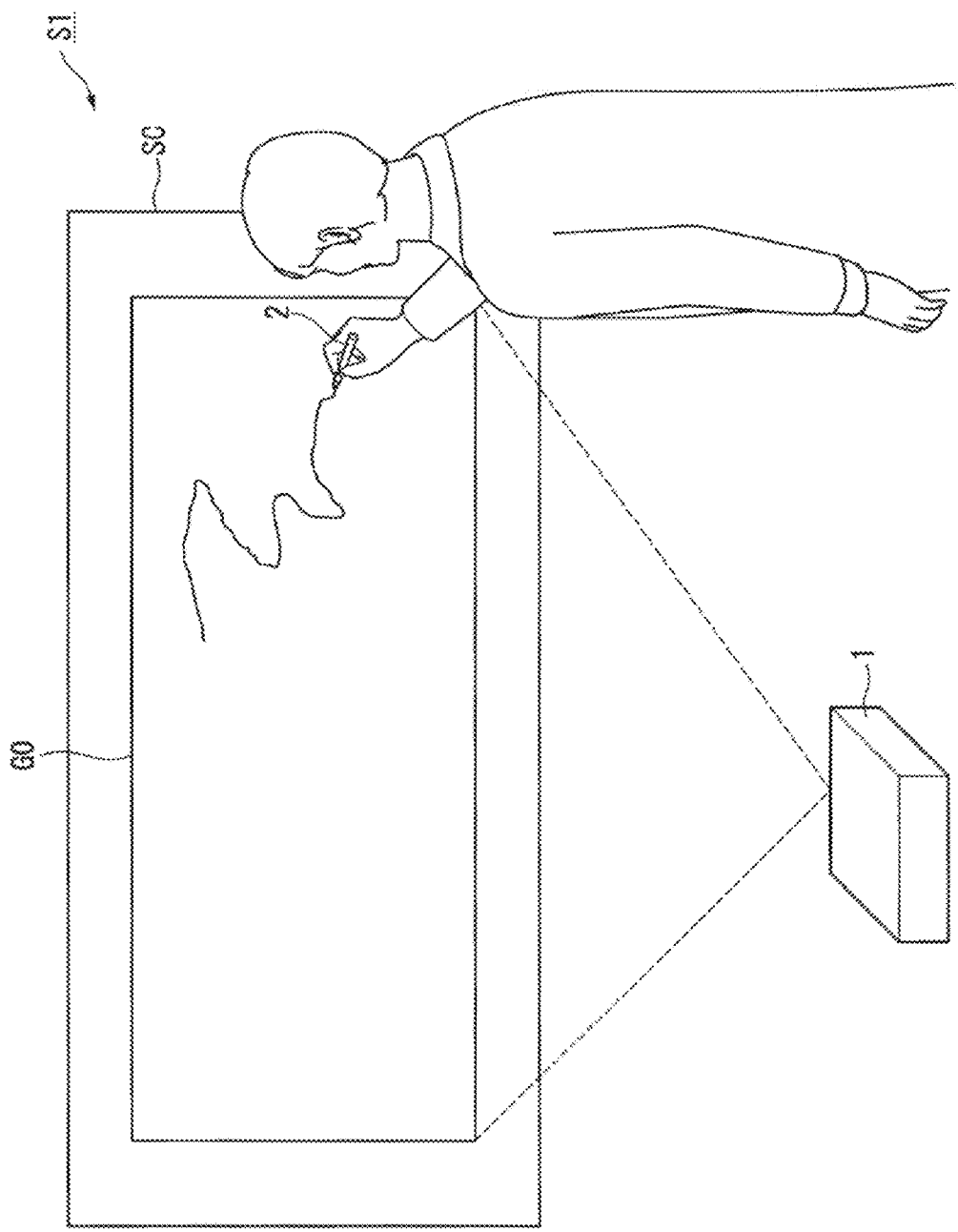
FIG. 1 is a schematic diagram showing an example of a configuration of an interactive system according to an embodiment of the invention.

FIG. 1 is a schematic diagram showing an example of a configuration of an interactive system S1 according to the embodiment of the invention.

The interactive system S1 is configured including a projector 1 for projecting an image on a projection surface SC, and a light emitting pen 2 for emitting an infrared ray from a pen tip. The user can perform an operation of pointing a desired position on a projection image G0 projected on the projection surface SC with the light emitting pen 2, and an operation of drawing a character or a figure on the projection image G0 with the light emitting pen 2. The projector 1 detects the infrared ray to recognize the position of the light emitting pen 2, and performs an operation corresponding to the operation content of the user.

Figure 2:
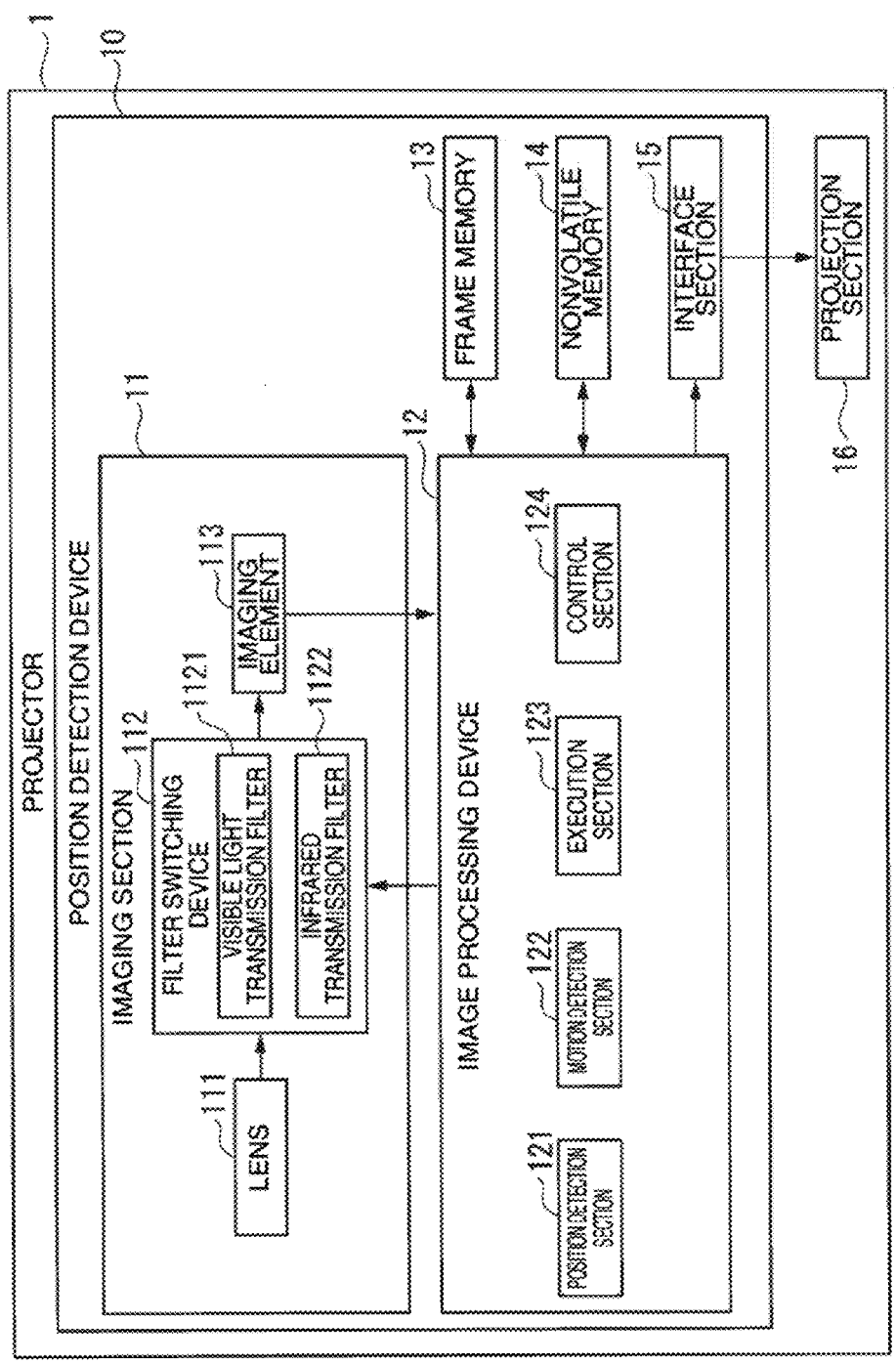
FIG. 2 is a schematic block diagram showing an example of a configuration of a projector according to the embodiment of the invention.

FIG. 2 is a schematic block diagram showing an example of a configuration of a projector 1 according to the embodiment of the invention.

The projector 1 is configured including a position detection device 10 and a projection section 16. The position detection device 10 is configured including an imaging section 11, an image processing device 12, a frame memory 13, a nonvolatile memory 14, and an interface section 15. The imaging section 11 is configured including a lens 111, a filter switching device 112, and an imaging element 113. The filter switching device 112 is configured including a visible light transmission filter 1121 and an infrared transmission filter 1122. The image processing device 12 is configured including a position detection section 121, a motion detection section 122, an execution section 123, and a control section 124. Although the projector 1 is provided with other functions of a general projector, such functions will be omitted from the drawings and the explanation.

The imaging section 11 is disposed in the vicinity of a projection lens (not shown) of the projector 1, and shoots a range including the projection image G0 projected on the projection surface SC at a predetermined frame rate. The imaging section 11 generates image information representing the image (hereinafter referred to as a shot image) thus shot, and then outputs the image information thus generated to the image processing device 12.

The filter switching device 112 switches between the visible light transmission filter 1121 and the infrared transmission filter 1122 based on an instruction signal input from the image processing device 12. The visible light transmission filter 1121 is an optical filter for transmitting visible light, and the infrared transmission filter 1122 is an optical filter for transmitting an infrared ray.

The imaging element 113 is formed of, for example, a CCD (charge coupled device) sensor or a CMOS (complementary metal oxide semiconductor) sensor.

In the state in which the filter switching device 112 keeps switching to the visible light transmission filter 1121, the imaging section 11 images the visible light in the range including the projection image G0 projected on the projection surface SC on the imaging element 113 via the lens 111 and the visible light transmission filter 1121. Further, in the state in which the filter switching device 112 keeps switching to the infrared transmission filter 1122, the imaging section 11 images the infrared ray emitted by the light emitting pen 2 or the like on the imaging element 113 via the lens 111 and the infrared transmission filter 1122.

The image processing device 12 is provided with a central processing unit (CPU), a random access memory (RAM) used for, for example, temporarily storing a variety of data, and a nonvolatile memory (all not shown) such as a mask read only memory (ROM), a flash memory, or a ferroelectric random access memory (FeRAM). Further, the image processing device 12 is provided with a control device for controlling the projector 1, a processor for processing the image, and so on.

The image processing device 12 generates position information representing the position of the light emitting pen 2 based on the image information input from the imaging section 11, and then outputs the position information thus generated to the projection section 16 via the interface section 15. Further, it is possible for the image processing device 12 to output a command to the projection section 16 via the interface section 15 to provide a variety of instructions to the projection section 16.

The execution section 123 performs a calibration (formation of the positional correspondence between the projection image and the shot image). For example, the execution section 123 makes the projection section 16 project a predetermined image (a calibration image) including a plurality of measurement points, and further, makes the imaging section 11 shoot the projection surface SC (visible light) in the state in which the projection section 16 keeps projecting the calibration image. Then, the execution section 123 derives the positional correspondence relationship between the projection image and the shot image based on the positions of the measurement points in the projection image (the calibration image) and the positions of the measurement points in the shot image. Specifically, the execution section 123 generates a conversion table having the correspondence between the positions on the shot image and the positions on the projection image, namely a conversion table for converting the positions on the shot image into the positions on the projection image, and then stores the conversion table in the nonvolatile memory 14.

The execution section 123 makes the imaging section 11 shoot the visible light in the range including the projection image G0 projected on the projection surface SC when performing the calibration. Further, the execution section 123 performs the edge detection on the shot image thus shot, and then stores the image information obtained by the edge detection in the frame memory 13 and the nonvolatile memory 14. It should be noted that in the following explanation, the image information, which the execution section 123 makes the imaging section 11 shoot, and then stores in the frame memory 13 when performing the calibration, is referred to as reference image information, and an image represented by the reference image information is referred to as a reference image.

Figure 3:
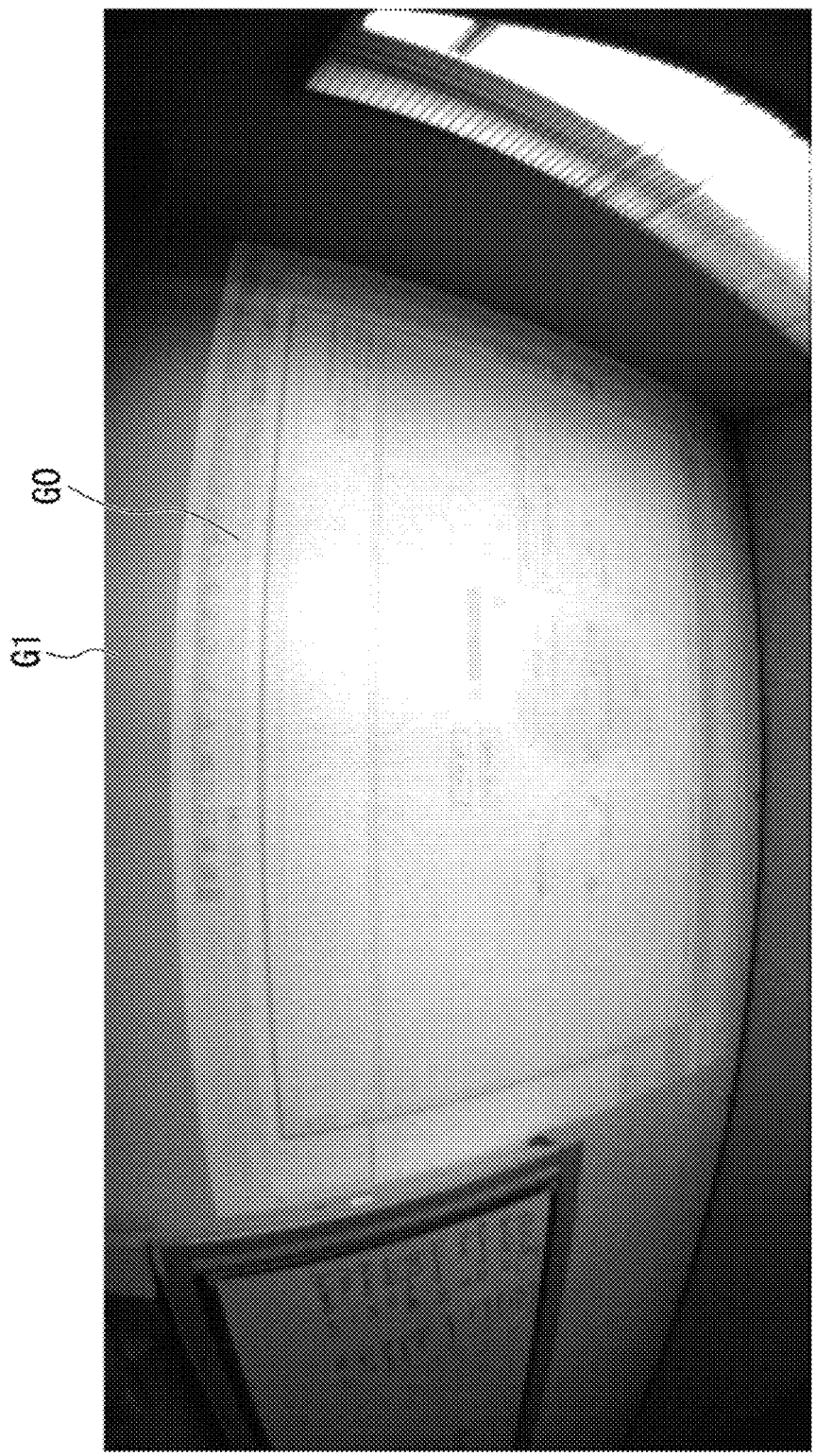
FIG. 3 is a diagram showing an example of a shot image shot by an imaging section according to the embodiment.

FIG. 3 is a diagram showing an example of the shot image G1 shot by the imaging section 11 according to the present embodiment.

Figure 4:
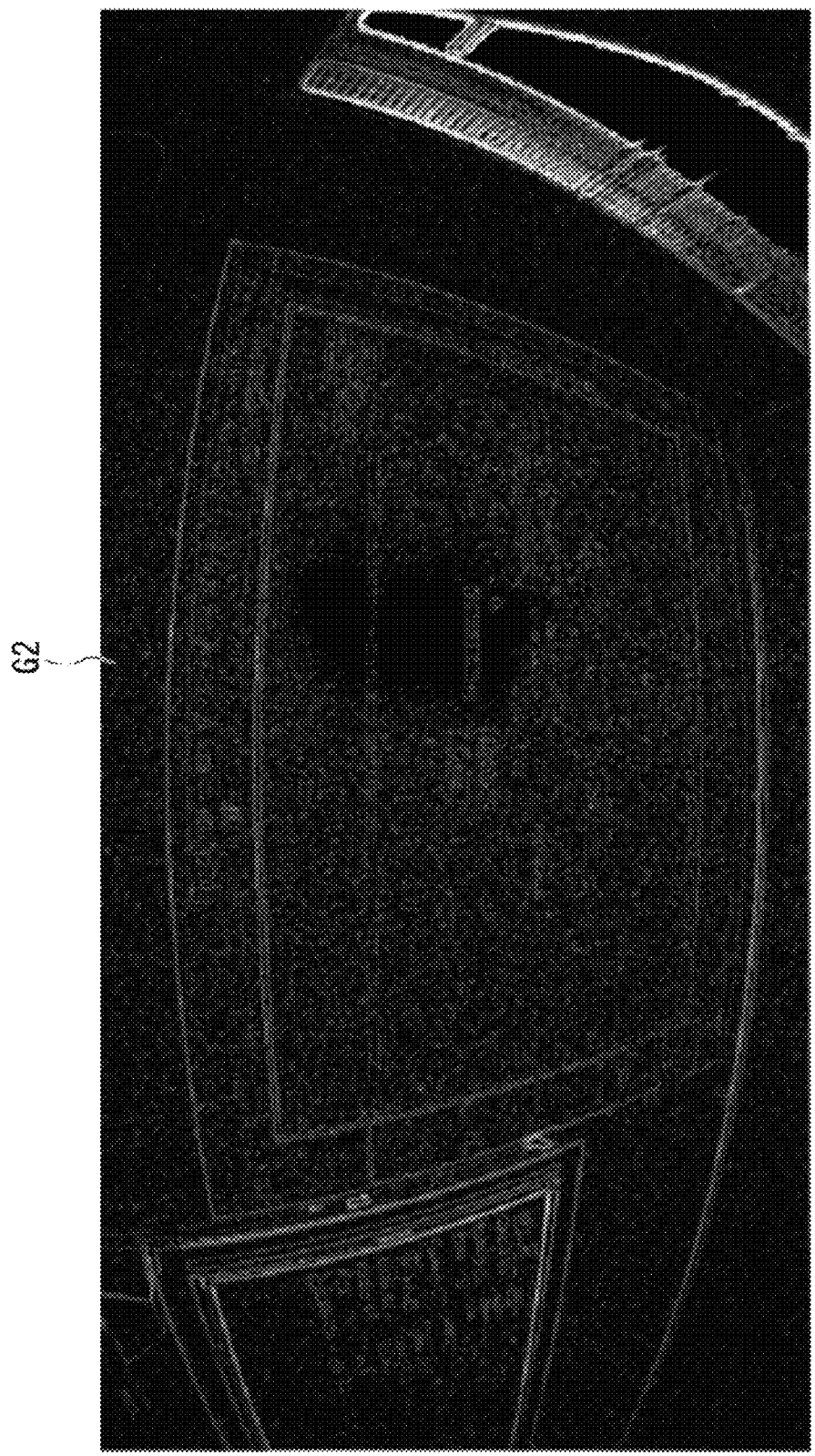
FIG. 4 is a diagram showing an example obtained when an image processing device performs a detection-filtering process on the shot image according to the embodiment.

FIG. 4 is a diagram showing an example obtained when the execution section 123 of the image processing device 12 performs a detection-filtering process on the shot image G1 according to the present embodiment.

The shot image G1 in FIG. 3 is an image in the range including the projection image G0 (FIG. 3) projected on the projection surface SC. The execution section 123 performs the filtering process using a detection filter (e.g., an edge detection filter) on the shot image G1 to obtain an edge detection image G2 shown in FIG. 4. The execution section 123 stores the image information representing the edge detection image G2 in the frame memory 13 and the nonvolatile memory 14 as the reference image information.

The position detection section 121 detects the position (the positional coordinates on the projection image) of the light emitting pen 2 based on the image information input from the imaging section 11. Specifically, the position detection section 121 detects the position of the light emitting pen 2 in the shot image based on the image information generated by the imaging section 11 performing shooting via the infrared transmission filter 1122. Then, the position detection section 121 derives the position of the light emitting pen 2 in the projection image based on the conversion table generated by the calibration, and then outputs the position information representing the position to the projection section 16. It should be noted that in the following explanation, the operation of the position detection section 121 detecting the position of the light emitting pen 2 is referred to as pen tracking.

The motion detection section 122 analyzes the image information obtained by making the imaging section 11 shoot the visible light in the range including the projection image G0, and then detects the motion of the projector 1 based on the analysis result. Here, the motion detection of the projector 1 is an operation of detecting a change in the positional relationship between the projector 1 and the projection surface SC, namely a change in the installation angle with respect to the projection surface SC, the distance between the projection surface SC and the projector 1, the height of the projector 1 installed on a installation surface such as a floor surface or a ceiling, and so on, as the motion of the projector 1 in the case in which the change is caused by some external factor after the projector 1 performs the calibration. The motion detection section 122 performs the motion detection of the projector 1 in a short amount of time in the case (e.g., the light emitting pen 2 does not emit light) in which no problem occurs if the position detection section 121 fails to perform the pen tracking of the light emitting pen 2.

The motion detection section 122 performs the edge detection on the shot image thus shot, and then compares the image information obtained by performing the edge detection and the reference image information stored in the frame memory 13 with each other to detect the motion of the projector 1. In other words, the motion detection section 122 detects the motion of the projector 1 based on the change in the shot image from when performing the calibration.

The control section 124 controls the operation of the whole of the image processing device 12 including the execution section 123, the position detection section 121, and the motion detection section 122 described above.

The frame memory 13 is a large-capacity volatile memory such as a dynamic random access memory (DRAM), and stores the image information representing the shot image shot by the imaging section 11.

The nonvolatile memory 14 is a nonvolatile memory such as a flash memory, and stores the image information representing the shot image shot by the imaging section 11.

Thus, since the nonvolatile memory 14 stores the image information substantially the same as the image information stored in the frame memory 13, even in the case in which the projector 1 is set to the power OFF state due to some cause, the reference image information before the projector 1 is set to the power OFF state is kept when the projector 1 is set to the power ON state. Therefore, the projector 1 can perform the motion detection without reacquiring the reference image information.

The interface section 15 is an interface such as USB (universal serial bus) used when the image processing device 12 outputs the position information of the light emitting pen 2, a command, and so on to the projection section 16.

The projection section 16 is provided with a light source such as a discharge lamp, a light modulation device such as a liquid crystal panel, a projection optical system (all not shown) such as a projection lens, and so on, and modulates the light emitted from the light source with the light modulation device based on the image signal input from the outside, and then projects the result from the projection optical system. Further, it is possible for the projection section 16 to project the calibration image, and project a predetermined mark (e.g., a pointer shaped like an arrow) at a position represented by the position information input from the image processing device 12 in a superimposed manner based on a command input from the image processing device 12.

The light emitting pen 2 is provided with the light emitting element (e.g., an infrared light emitting diode (LED)) for emitting the infrared ray and a hold-down switch, wherein the light emitting element and the switch are both disposed at the pen tip. The light-emitting pen 2 changes the light emitting pattern in accordance with whether or not the switch is held down. Therefore, the projector 1 can distinguish between the state in which the pen tip of the light emitting pen 2 has contact with the projection surface SC and the state (hereinafter referred to as a hovering state) in which the pen tip is separated from the projection surface SC. It should be noted that it is also possible to provide the light emitting pen 2 with a configuration of emitting light only in the case in which the switch is held down.

Figure 5:
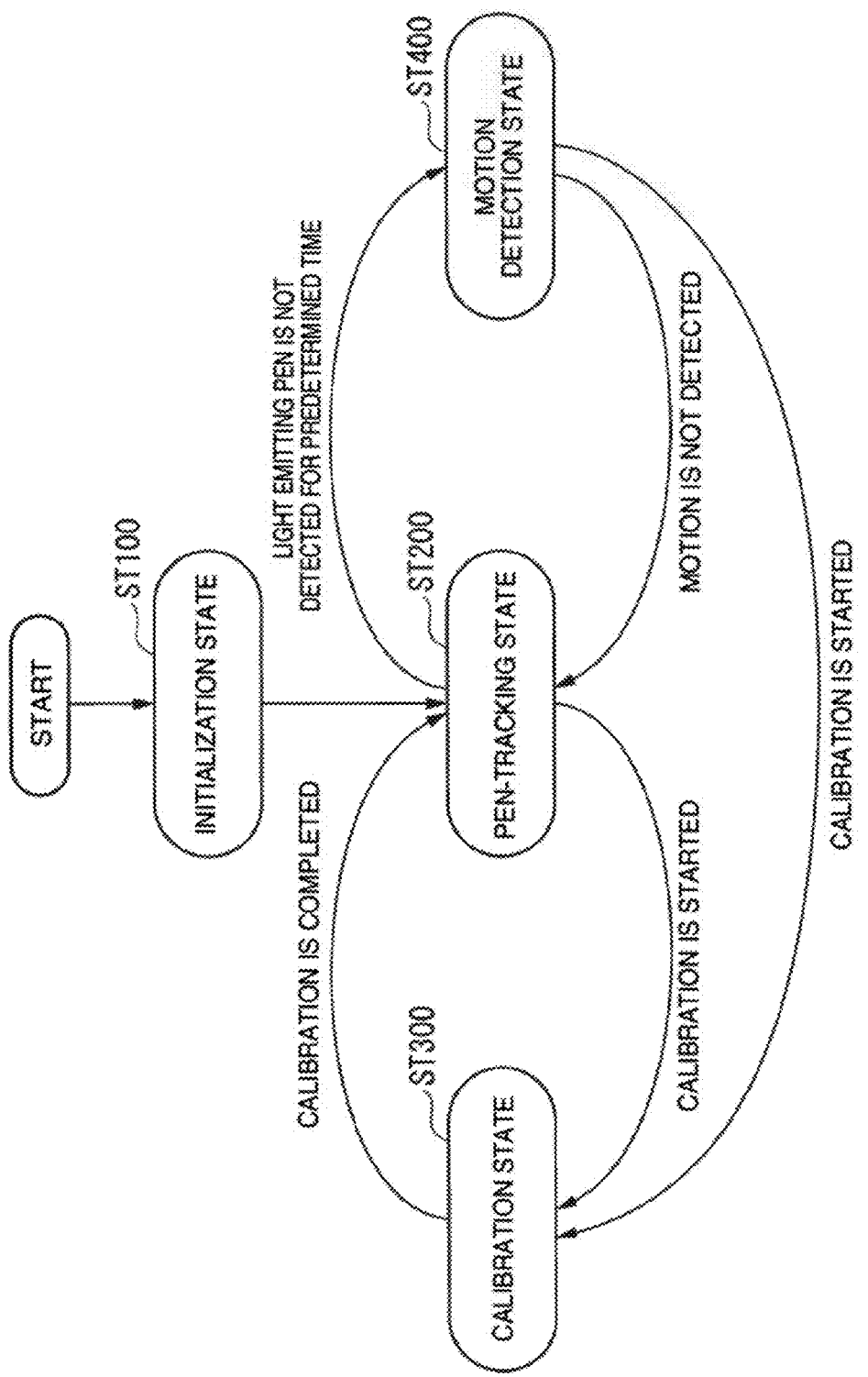
FIG. 5 is a state transition diagram showing an example of the state transition of a position detection device according to the embodiment.

FIG. 5 is a state transition diagram showing an example of the state transition of the position detection device 10 according to the present embodiment. When the main power (not shown) of the projector 1 is set to the ON state, the position detection device 10 makes a transition to the step ST100 (an initialization state) to perform an initialization process described later, and then makes a transition to the step ST200 (a pen-tracking state).

In the step ST200, the position detection device 10 performs the pen tracking. Here, the position detection device 10 makes a state transition to the step ST400 (a motion detection state) if the light emitting pen 2 is not detected (in the case of failure in the light emitting pen detection) for a predetermined amount of time. Further, the position detection device 10 makes a state transition to the step ST300 (a calibration state) when the user instructs the execution of the calibration.

In the step ST300, the position detection device 10 performs the calibration. When the calibration is completed, the position detection device 10 makes a state transition to the step ST200 (the pen-tracking state).

In the step ST400, the position detection device 10 performs the motion detection of the projector 1. In the case in which no motion of the projector 1 is detected (failure in the motion detection), the position detection device 10 makes a state transition to the step ST200 (the pen tracking state). Further, in the case in which the position detection device 10 detects a motion of the projector 1, the position detection device 10 prompts the user for the execution of the calibration. Then, the position detection device 10 makes a state transition to the step ST300 (a calibration state) when the user instructs the execution of the calibration.

Figure 6:
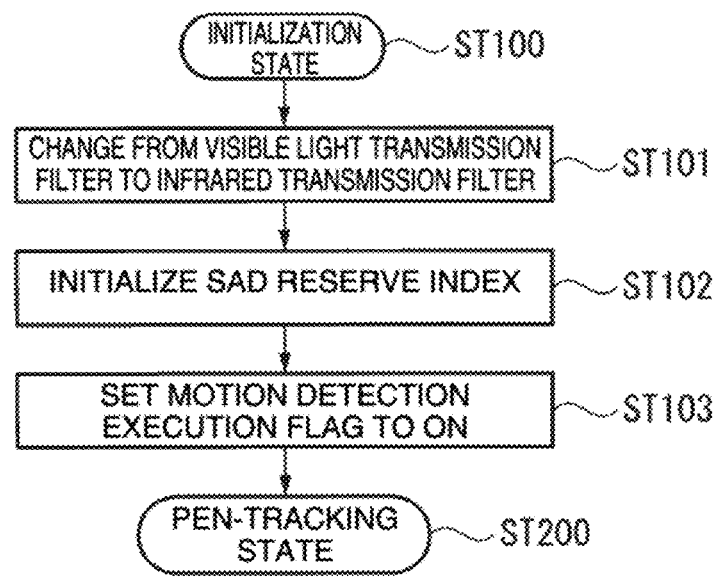
FIG. 6 is a flowchart showing an example of an initializing process of the position detection device according to the embodiment.

FIG. 6 is a flowchart showing an example of the initialization process of the position detection device 10 according to the present embodiment.

The present flowchart is for explaining the initialization process in the initialization state in the step ST100 shown in FIG. 5.

In the step ST101, the control section 124 outputs an instruction signal for instructing the filter switching device 112 to switch from the visible light transmission filter 1121 to the infrared transmission filter 1122. The filter switching device 112 switches to the infrared transmission filter 1122 based on the instruction signal.

In the step ST102, the control section 124 initializes an SAD reserve index i to an initial value (e.g., 0). The SAD reserve index i will be described later.

In the step ST103, the control section 124 sets a motion detection execution flag, which represents whether or not the motion detection of the projector 1 is to be performed, to ON ("to be performed").

When the initialization process is completed, the position detection device 10 proceeds to the step ST200 (the pen-tracking state).

Figure 7:
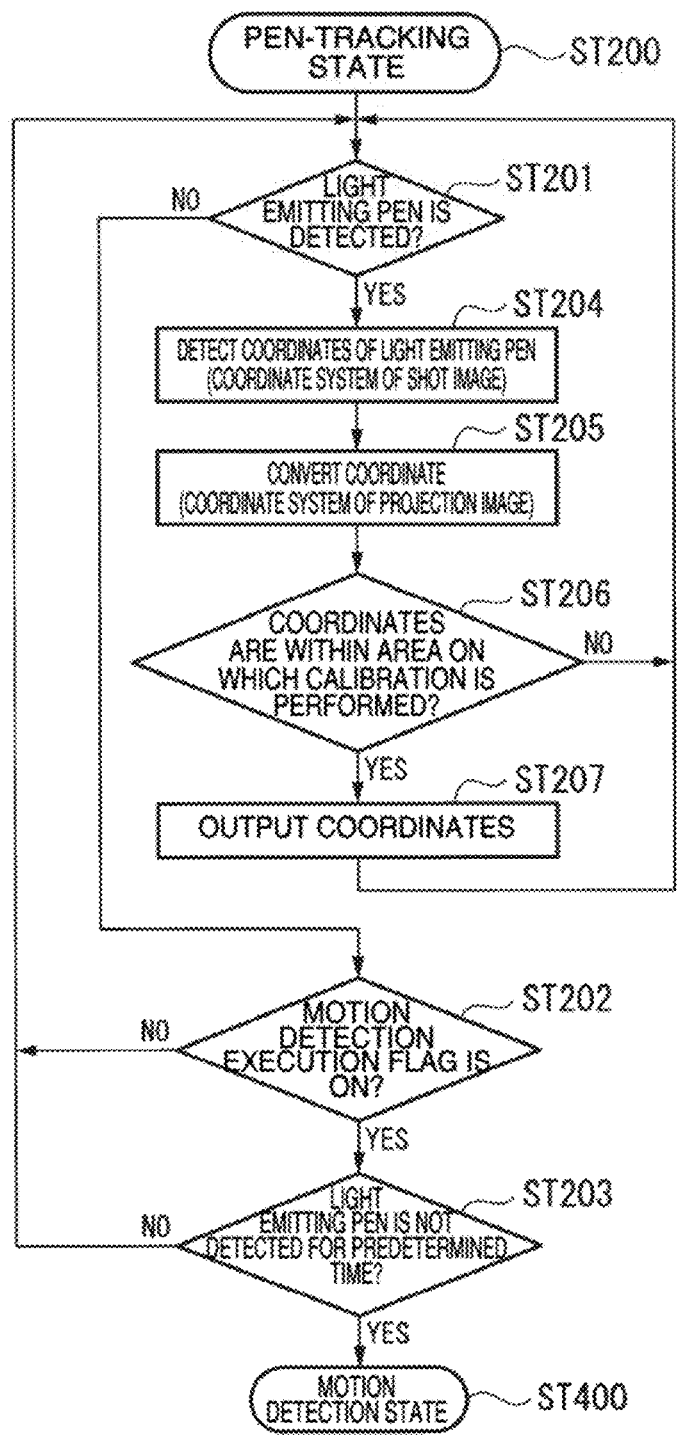
FIG. 7 is a flowchart showing an example of a pen-tracking process of the position detection device according to the embodiment.

FIG. 7 is a flowchart showing an example of the pen-tracking process of the position detection device 10 according to the present embodiment.

The present flowchart is for explaining the pen-tracking process in the pen-tracking state in the step ST200 shown in FIG. 5.

In the step ST201, the position detection section 121 performs the detection of the light emitting pen 2. In the case in which the position detection section 121 detects the light emitting pen 2, the process proceeds to the step ST204. On the other hand, in the case in which the position detection section 121 fails to detect the light emitting pen 2, the process proceeds to the step ST202.

In the step ST202, the position detection section 121 determines whether or not the motion detection execution flag is ON. In the case in which the motion detection execution flag is ON, the process proceeds to the step ST203. On the other hand, in the case in which the motion detection execution flag is OFF, the process returns to the step ST201.

In the step ST203, the position detection section 121 determines whether or not the light emitting pen 2 is not detected for a period equal to or longer than the predetermined amount of time. In the case in which the position detection section 121 fails to detect the light emitting pen 2 for the period equal to or longer than the predetermined amount of time, the process proceeds to the step ST400 (the motion detection state). On the other hand, in the case in which the period for which the position detection section fails to detect the light emitting pen 2 is shorter than the predetermined amount of time, the process returns to the step ST201.

In the step ST204, the position detection section 121 detects the position (the positional coordinates of the light emitting pen 2 in the coordinate system of the shot image) of the light emitting pen 2 from the shot image shot by the imaging section 11.

In the step ST205, the position detection section 121 performs the coordinate conversion on the positional coordinates of the light emitting pen 2 in the coordinate system of the shot image into the positional coordinates in the coordinate system of the projection image projected by the projection section 16.

In the step ST206, the position detection section 121 determines whether or not the positional coordinates of the light emitting pen 2 in the coordinate system of the projection image obtained by the conversion are located within the area (e.g., within the range of the projection image) on which the calibration has been performed. In the case in which the positional coordinates of the light emitting pen 2 in the coordinate system of the projection image are located within the area on which the calibration has been performed, process proceeds to the step ST207. On the other hand, in the case in which the positional coordinates of the light emitting pen 2 in the coordinate system of the projection image are not located within the area on which the calibration has been performed, process returns to the step ST201.

In the step ST207, the control section 124 outputs the positional coordinates of the light emitting pen 2 in the coordinate system of the projection image converted by the position detection section 121 to the projection section 16 as the position information via the interface section 15, and then returns to the step ST201. When the position information is input, the projection section 16 projects, for example, a predetermined mark (e.g., a pointer shaped like an arrow) at the position represented by the position information in a superimposed manner.

Figure 8:
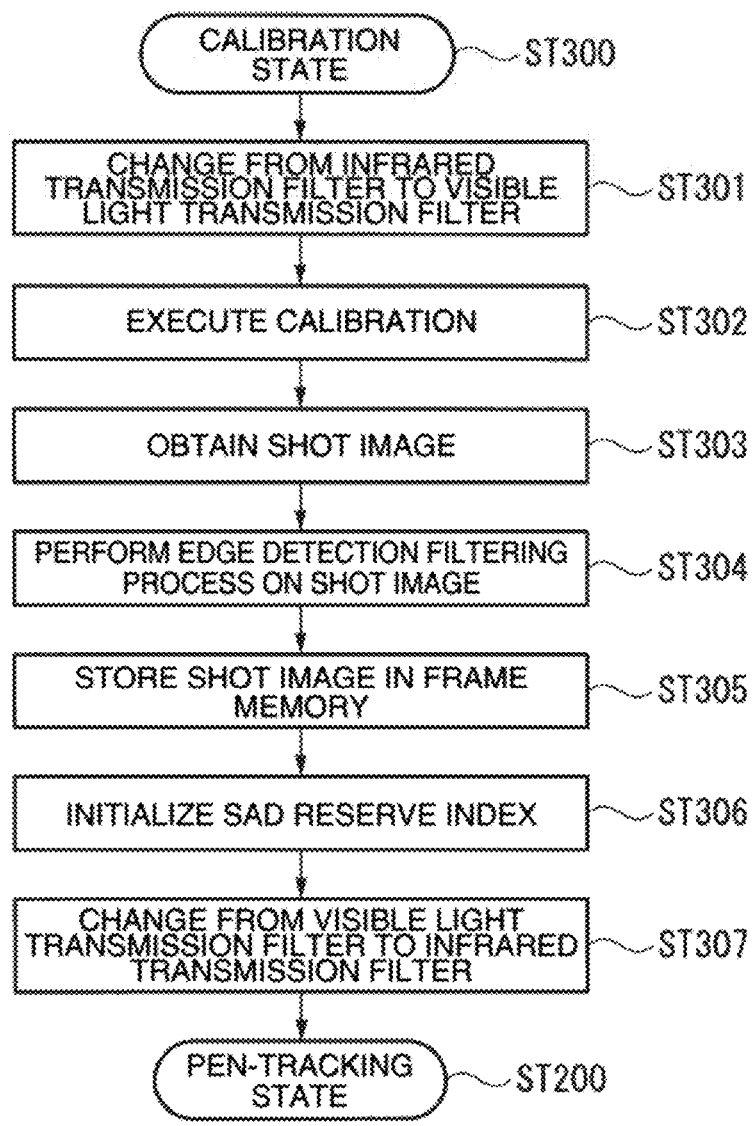
FIG. 8 is a flowchart showing an example of a calibration process of the position detection device according to the embodiment.

FIG. 8 is a flowchart showing an example of the calibration process of the position detection device 10 according to the present embodiment.

The present flowchart is for explaining the calibration process in the calibration state in the step ST300 shown in FIG. 5.

In the step ST301, the control section 124 outputs an instruction signal for instructing the filter switching device 112 to switch from the infrared transmission filter 1122 to the visible light transmission filter 1121. The filter switching device 112 switches to the visible light transmission filter 1121 based on the instruction signal. On this occasion, the execution section 123 outputs a command to the projection section 16 to project the calibration image.

In the step ST302, the execution section 123 performs the calibration described above.

In the step ST303, the execution section 123 obtains the shot image shot by the imaging section 11.

In the step ST304, the execution section 123 performs the filtering process with the edge detection filter on the shot image thus obtained to perform the edge detection.

In the step ST305, the execution section 123 stores the shot image on which the edge detection has been performed in the frame memory 13 as the reference image.

In the step ST306, the control section 124 initializes the SAD reserve index i to an initial value (e.g., 0). The SAD reserve index i will be described later.

In the step ST307, the control section 124 outputs an instruction signal for instructing the filter switching device 112 to switch from the visible light transmission filter 1121 to the infrared transmission filter 1122. The filter switching device 112 switches to the infrared transmission filter 1122 based on the instruction signal.

When the calibration process is completed, the position detection device 10 proceeds to the step ST200 (the pen-tracking state).

Figure 9:
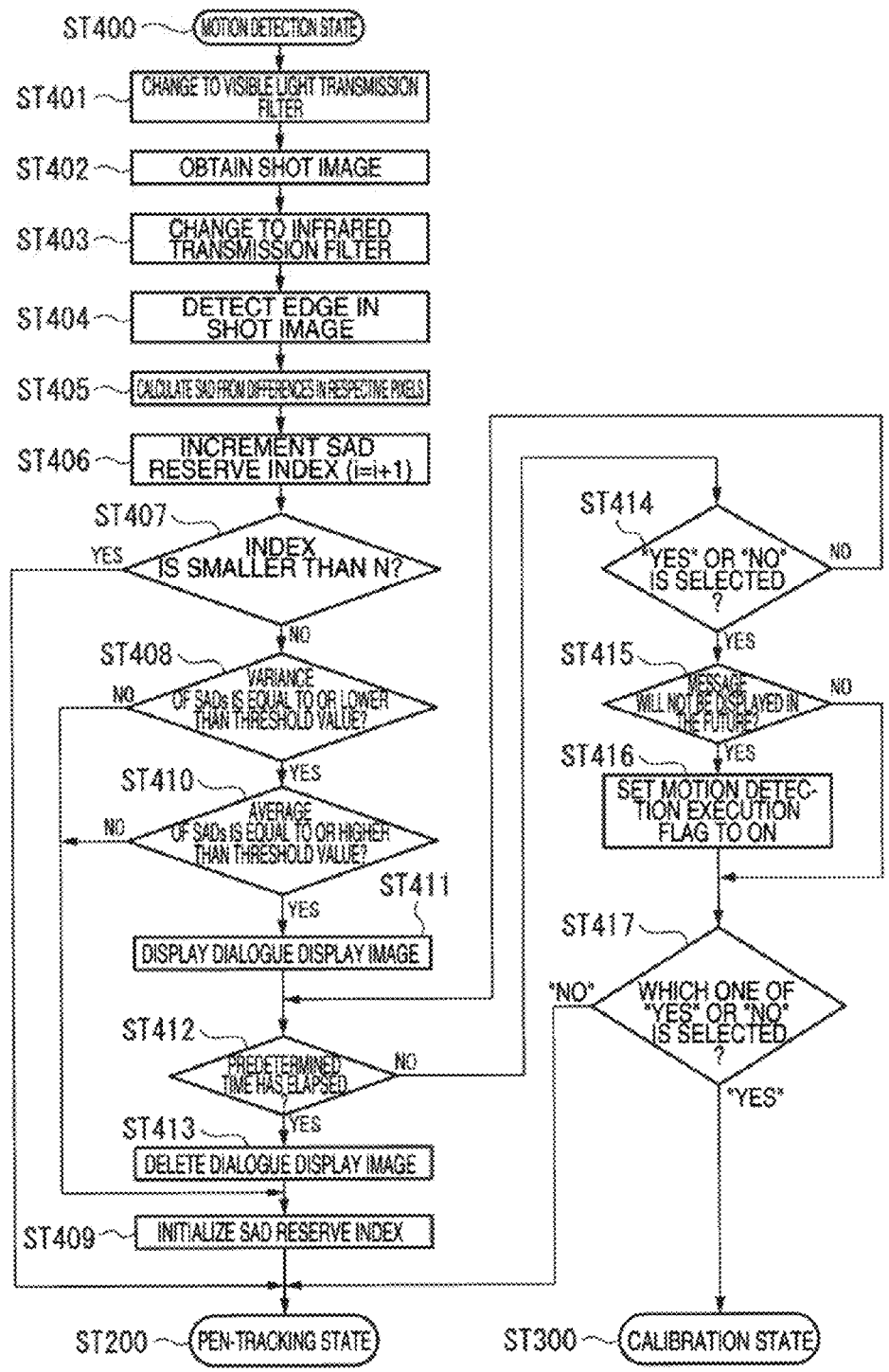
FIG. 9 is a flowchart showing an example of a motion detection process of the position detection device according to the embodiment.

FIG. 9 is a flowchart showing an example of the motion detection process of the position detection device 10 according to the present embodiment.

The present flowchart is for explaining the motion detection process in the motion detection state in the step ST400 shown in FIG. 5.

In the step ST401, the control section 124 outputs an instruction signal for instructing the filter switching device 112 to switch from the infrared transmission filter 1122 to the visible light transmission filter 1121. The filter switching device 112 switches to the visible light transmission filter 1121 based on the instruction signal.

In the step ST402, the motion detection section 122 obtains the shot image of the visible light shot by the imaging section 11.

In the step ST403, the control section 124 outputs an instruction signal for instructing the filter switching device 112 to switch from the visible light transmission filter 1121 to the infrared transmission filter 1122. The filter switching device 112 switches to the infrared transmission filter 1122 based on the instruction signal. As described above, the control section 124 temporarily outputs the instruction signal for instructing to switch from the infrared transmission filter 1122 to the visible light transmission filter 1121 in order to make the imaging section 11 take the shot image of the visible light.

In the step ST404, the motion detection section 122 performs the filtering process with the edge detection filter on the shot image thus obtained to perform the edge detection.

In the step ST405, the motion detection section 122 compares the shot image on which the edge detection is performed and the reference image stored in the frame memory 13 with each other to detect the motion of the projector 1. Specifically, the motion detection section 122 derives the difference between the shot image on which the edge detection has been performed and the reference image for each of the corresponding pixels to thereby calculate the sum of absolute difference (SAD). The motion detection section 122 reserves the SAD thus calculated in the RAM in the image processing device 12 as an array SAD[i] (i=0 through N−1). Here, i is the SAD reserve index described above, and N is the number of times of the shooting which the imaging section 11 is made to perform. In other words, the motion detection section 122 calculates the SAD every time the motion detection section 122 makes the imaging section perform shooting, and then sequentially reserves the SAD in the array SAD[i], and when the number of times of shooting reaches N, the motion detection section 122 detects the motion of the projector 1 based on the plurality of SADs respectively reserved in the array elements SAD[0] through SAD[N−1].

It should be noted that although in the present embodiment it is arranged that the motion of the projector 1 is detected by performing the shooting a plurality of number of times, in the case of, for example, detecting the motion of the projector 1 by performing the shooting only once, there might occur the case in which the SAD calculated by the motion detection section 122 becomes large when the imaging section 11 shoots a person temporarily entering the shooting range, and is erroneously detected as the motion of the projector 1. In order to inhibit such erroneous detection, it is arranged in the present embodiment that the motion of the projector 1 is detected by performing shooting a plurality of number of times, and thus, the detection accuracy can be improved.

In the step ST406, the motion detection section 122 increments (i=i+1) the SAD reserve index i of the array SAD[i].

In the step ST407, the motion detection section 122 compares the SAD reserve index i after the increment and the number N of times of shooting with each other to determine whether or not the SAD reserve index i is smaller than the number N of times of shooting. In the case in which the SAD reserve index i is smaller than the number N of times of shooting, the process returns to the step ST200 (the pen-tracking state). On the other hand, in the case in which the SAD reserve index is not smaller than the number N of times of shooting, namely the case in which the SAD reserve index i is equal to or larger than the number N of times of shooting, the process proceeds to the step ST408.

In the step ST408, the motion detection section 122 calculates the variance of the array elements from SAD[0] to SAD[N−1], and then determines whether or not the variance thus calculated is equal to or lower than a predetermined threshold value. In the case in which the variance of the array elements from SAD[0] to SAD[N−1] is not equal to or lower than the predetermined threshold value, the process proceeds to the step ST409. On the other hand, in the case in which the variance of the array elements from SAD[0] to SAD[N−1] is equal to or lower than the predetermined threshold value, the process proceeds to the step ST410.

In the step ST409, the motion detection section 122 determines that it is difficult to correctly detect the motion of the projector 1 on the grounds that the variance of the SADs, namely the variation in image between the shot images, is too large. Then, the motion detection section initializes the SAD reserve index i, and then the process returns to the step ST200 (the pen-tracking state).

In the step ST410, the motion detection section 122 determines whether or not the average of the array elements from SAD[0] to SAD[N−1] is equal to or higher than a predetermined threshold value. In the case in which the average of the array elements from SAD[0] to SAD[N−1] is not equal to or higher than the predetermined threshold value, namely the case in which the average is lower than the predetermined threshold value, it is determined that the projector 1 has not moved, and the process proceeds to the step ST409. On the other hand, in the case in which the average of the array elements from SAD[0] to SAD[N−1] is equal to or higher than the predetermined threshold value, it is determined that the projector 1 has moved, and the process proceeds to the step ST411.

In the step ST411, the control section 124 outputs a command to the projection section 16 to make the projection section 16 project a dialogue display image W1.

Figure 10:
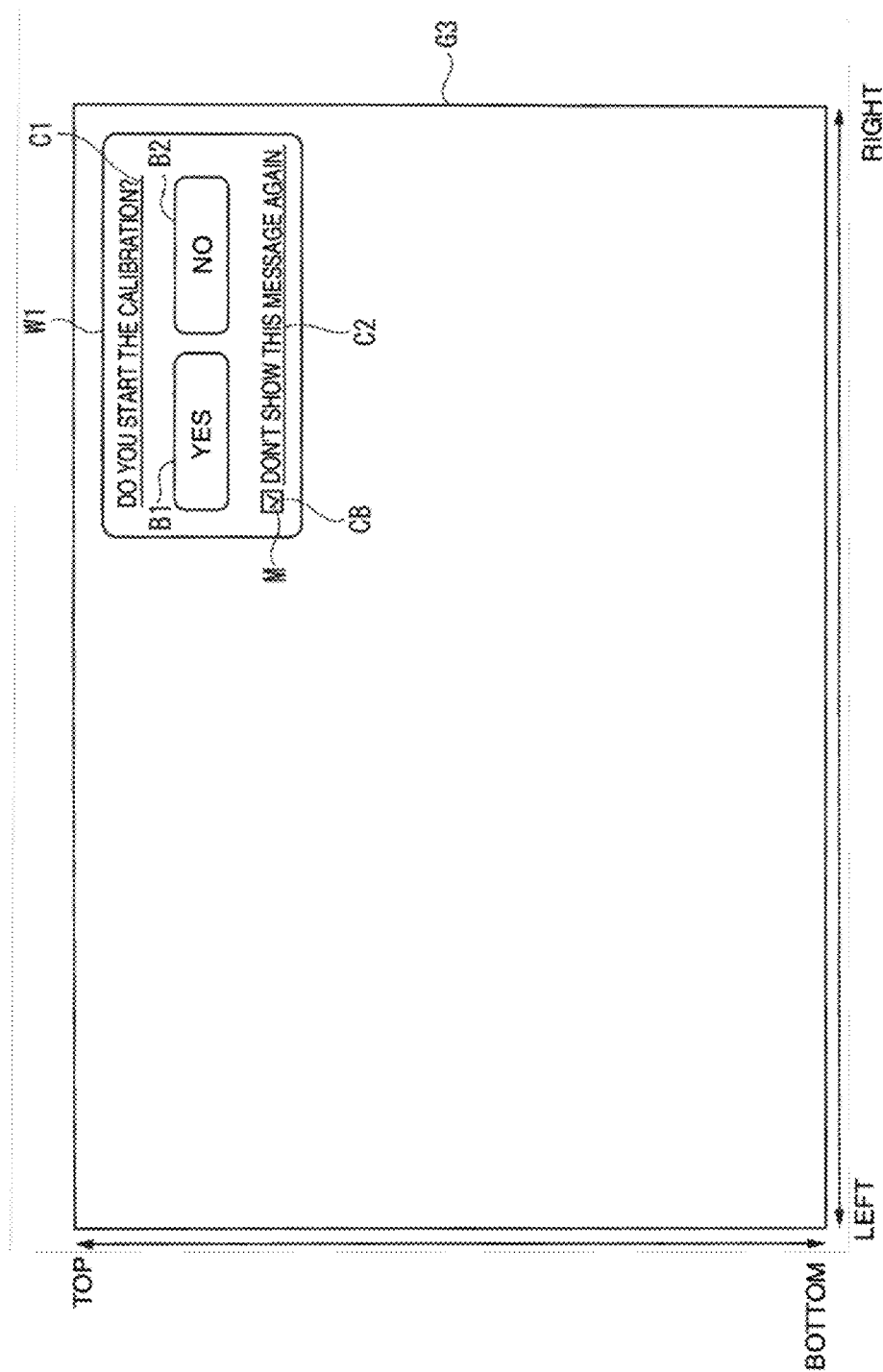
FIG. 10 is a schematic diagram showing an example of a dialogue display image, which is generated in a generation section of the image processing device according to the embodiment, and then projected by a projection section.

FIG. 10 is a schematic diagram showing an example of the dialogue display image projected by the projection section 16.

The dialogue display image W1 is displayed in, for example, an upper right end portion of the projection image G3. The dialogue display image W1 includes a message C1 prompting the calibration such as "DO YOU START THE CALIBRATION?", a comment C2 "DON'T SHOW THIS MESSAGE AGAIN," operation icons (operation buttons) B1 "YES" and B2 "NO," and a check box CB corresponding to the comment C2 "DON'T SHOW THIS MESSAGE AGAIN." The user can insert a check mark M in the check box CB, and select either of the operation icons B1 "YES" and B2 "NO" using, for example, an operation section (not shown) provided to the projector 1.

Going back to FIG. 9, in the step ST412, the control section 124 determines whether or not a predetermined time has elapsed after making the dialogue display image W1 be projected. In the case in which the predetermined time has elapsed, the process proceeds to the step ST413. On the other hand, in the case in which the predetermined time has not yet elapsed, the process proceeds to the step ST414.

In the step ST413, the control section 124 outputs a command to the projection section 16 to make the dialogue display image W1 be deleted from the projection image. Then, in the step ST409, the control section 124 initializes the SAD reserve index i, and then the process returns to the step ST200 (the pen-tracking state).

In the step ST414, the control section 124 determines whether or not the operation icon B1 "YES" or the operation icon B2 "NO" included in the dialogue display image W1 is selected. In the case in which the operation icon B1 "YES" or the operation icon B2 "NO" is selected, the process proceeds to the step ST415. On the other hand, in the case in which neither the operation icon B1 "YES" nor the operation icon B2 "NO" is selected, the process returns to the step ST412.

In the step ST415, the control section 124 determines whether or not the dialogue display image W1 will not be displayed in the future, namely whether or not the check mark M is inserted in the check box CB. In the case in which the dialogue display image W1 will not be displayed in the future, namely the check mark M is inserted in the check box CB, the process proceeds to the step ST416. On the other hand, in the case in which the dialogue display image W1 will be displayed in the future, namely the check mark M is not inserted in the check box CB, the process proceeds to the step ST417.

In the step ST416, the control section 124 changes the motion detection execution flag to OFF, and then the process proceeds to the step ST417.

In the step ST417, the control section 124 determines which one of the operation icon B1 "YES" and the operation icon B2 "NO" is selected. In the case in which the operation icon B1 "YES" is selected, the control section 124 makes a state transition to the step ST300 (the calibration state), and then makes the execution section 123 execute the calibration. On the other hand, in the case in which the operation icon B2 "NO" is selected, the control section 124 makes a state transition to the step ST200 (the pen-tracking state), and then makes the position detection section 121 perform the pen tracking.

It should be noted that although in the present embodiment, the motion detection of the projector 1 is explained using the edge detection, it is also possible to detect the motion of the projector 1 with a gyro sensor, an acceleration sensor, and so on and then perform the motion detection based on the detection result, or it is also possible to detect the motion of the projector 1 using both of the edge detection and the detection result of the gyro sensor and so on. Thus, the detection accuracy in the motion detection of the projector 1 can be improved. Further, although in the present embodiment, the case of prompting the execution of the calibration is explained, it is also possible to automatically perform the calibration without prompting the execution of the calibration.

As described above, according to the present embodiment, the projector 1 is provided with the projection section 16 for projecting the projection image on the projection surface SC, the imaging section 11 for generating the shot image obtained by shooting the range including the projection image projected by the projection section 16, the detection section (the motion detection section 122) for detecting the motion of the device itself based on the shot image shot by the imaging section 11, and the execution section 123 for executing the predetermined process regarding the calibration for making the correspondence between the coordinate system of the projection image and the coordinate system of the shot image in the case in which the detection section (the motion detection section 122) detects the motion of the device itself.

Thus, the projector 1 can determine the change in the installation state of the projector 1 using the image processing, and can therefore detect the motion of the projector 1 without changing the hardware configuration. Further, the projector 1 can detect the motion of the device itself based on the shot image, and can perform the predetermined process regarding the calibration in the case of detecting the motion of the device itself. Therefore, the convenience of the user can be enhanced in the interactive system.

It should be noted that it can also be arranged that a part or the whole of the position detection device 10, the image processing device 12, and the projector 1 in the embodiment described above is realized by a computer. In this case, it is also possible to realize the control function by storing a program for realizing the control function in a computer-readable storage medium, and then making the computer system retrieve and then execute the program stored in the storage medium.

It should be noted that the "computer system" mentioned here corresponds to a computer system incorporated in the position detection device 10, the image processing device 12, or the projector 1, and should include an OS and hardware such as peripheral devices. Further, the "computer-readable storage medium" denotes a portable medium such as a flexible disk, a magneto-optical disk, a ROM, or a CD-ROM, and a storage device such as a hard disk incorporated in the computer system. Further, the "computer-readable storage medium" can include those dynamically holding a program for a short period of time such as a communication line in the case of transmitting the program via a communication line such as a telephone line or a network such as the Internet, and those holding a program for a certain period of time such as a volatile memory in a computer system to be a server or a client in such a case. Further, the program described above can be those for partially realizing the functions described above, or those capable of realizing the functions described above in combination with a program already stored in the computer system.

Further, it is also possible to realize a part or the whole of the position detection device 10, the image processing device 12, and the projector 1 in the embodiment described above as an integrated circuit such as an LSI (Large Scale Integration). Each of the functional blocks of the position detection device 10, the image processing device 12, and the projector 1 can individually be realized as a processor, or can partially or totally be integrated as a processor. Further, the method of the circuit integration is not limited to LSI, but the circuit can be realized by a dedicated circuit or a general-purpose processor. Further, in the case in which a technology of the circuit integration replacing the LSI appears due to the advance in semiconductor technology, it is also possible to use an integrated circuit derived from such a technology.

Although the embodiment of the invention is hereinabove explained in detail with reference to the accompanying drawings, the specific configuration is not limited to the configuration described above, but a variety of design changes can be made within the scope or the spirit of the invention.

For example, although in the embodiment described above, it is determined that the projector 1 is moved in the case in which the variance of the SADs corresponding to the N times of shooting is equal to or lower than the predetermined threshold value and the average of the SADs corresponding to the N times of shooting is equal to or higher than the predetermined threshold value, it is also possible to determine the motion of the projector 1 using only either one of the average and the variance.

Further, the light emitted by the light emitting pen 2 is not limited to the infrared ray, but can also be visible light. Further, the communication between the projector 1 and the light emitting pen 2 is not limited to the configuration using light, but can also be a configuration using radio waves such as Bluetooth (registered trademark) or a wireless local area network (LAN).

What is claimed is:

1. A projector comprising:
    a projection section configured to project a projection image on a projection surface;
    an imaging section configured to generate a shot image obtained by shooting a range including the projection image projected by the projection section, the imaging section being capable of shooting a visible light and an infrared light;
    a motion detection section configured to detect a motion of the projector based on the shot image of the visible light;
    a position detection section configured to detect a position of the infrared light emitted from a light emitting device onto the projection surface based on the shot image of the infrared light; and
    an execution section configured to project a display image including a message that prompts a user to start execution of a calibration for making a correspondence between a coordinate system of the projection image and a coordinate system of the shot image in a case in which the motion detection section detects the motion of the projector,
    wherein;
        the motion detection section performs motion detection of the projector when the infrared light is not detected on the projection surface for a predetermined amount of time,
        when the motion detection section detects that the motion of the projector is above a predetermined threshold value, the execution section projects the display image including the message prompting a user to start execution of the calibration, and
        when the motion detection section detects that the motion of the projector is below a predetermined threshold value, the execution section does not project the display image including the message prompting the user to start execution of the calibration.

2. The projector according to claim 1, wherein
the execution section is further configured to execute a process of executing the calibration.

3. The projector according to claim 1, wherein
the motion detection section detects the motion of the projector based on a change in image between a reference image shot by the imaging section in advance, and the shot image shot by the imaging section after shooting the reference image.

4. The projector according to claim 3, wherein
the motion detection section detects the motion of the projector based on a change in image between the reference image and a plurality of shot images shot by the imaging section after shooting the reference image.

5. The projector according to claim 4, wherein
the motion detection section calculates a sum of absolute differences from the reference image for each of the shot images, compares at least one of an average and a variance of the sums of absolute differences calculated with a predetermined threshold value, and detects the motion of the projector based on the comparison result.

6. A control method comprising:
    projecting, by a projector, a projection image on a projection surface;
    generating, by the projector, a shot image obtained by shooting a range including the projection image projected in the projecting, the shot image including a visible light and an infrared light;
    detecting, by the projector, a motion of the projector based on the shot image of the visible light;
    detecting a position of the infrared light emitted from a light emitting device onto the projection surface based on the shot image of the infrared light; and
    projecting a display image including a message that prompts a user to start execution of a calibration for making a correspondence between a coordinate system of the projection image and a coordinate system of the shot image in a case in which the motion of the projector is detected in the detecting,
wherein,
the detecting of the motion of the projector is performed when the infrared light is not detected on the projection surface for a predetermined amount of time,
when it is detected that the motion of the projector is above a predetermined threshold value, the projector projects the display image including the message prompting a user to start execution of the calibration, and
when it is detected that the motion of the projector is below a predetermined threshold value, the projector does not project the display image including the message prompting the user to start execution of the calibration.

7. The projector according to claim 1, wherein the execution section does not project the display image in a case in which the motion detection section does not detect the motion of the projector.

* * * * *